United States Patent Office 2,883,361
Patented Apr. 21, 1959

2,883,361

LIGHT STABLE COMPOSITION CONTAINING A BLEND OF A SYNTHETIC RUBBER AND A SALICYLATE POLYMER

Carleton T. Handy and Henry S. Rothrock, Wilmington, Del., assignors to E. I. du Pont de Nemours and Company, Wilmington, Del., a corporation of Delaware No Drawing. Application September 28, 1956
Serial No. 612,895

20 Claims. (Cl. 260—45.5)

This invention relates to new polymeric compositions. More particularly, it relates to organic polymers for use as supported coatings, self-supporting films, sheets, filaments, shaped objects, etc., which polymers have been stabilized against degradation by ultraviolet light.

This application is a continuation-in-part of our application Serial No. 511,780, filed May 27, 1955, the disclosure of which is hereby incorporated herein.

Many organic polymeric materials are sensitive to light in the ultraviolet range and particularly to radiations in the wavelength range of about 2300–3600 A. units. This is especially the case with organic polymers containing chlorine, oxygen or sulfur as constituent atoms in addition to carbon and hydrogen. When such polymers are exposed to radiations in the above-mentioned range, which are found in sunlight or are emitted by fluorescent lamps, sunlamps, arc lights and the like, they undergo changes which result in a decrease in, or even complete loss of, such important properties as strength, elasticity, pliability and electric-insulating capacity. Furthermore, the light-sensitive polymers may acquire an undesirable color on exposure, which renders them unsuitable for many uses.

It has been proposed to prevent or decrease the effects of light degradation by incorporating in the polymers susceptible to it small amounts of monomeric substances containing phenolic and/or carbonyl groups, such as, for example, salicylic acid esters. These compounds afford substantial protection against ultraviolet light but they have the inherent disadvantage of impermanence, that is, they are gradually removed from the polymer through their volatility, or washed out of it during laundering or dry-cleaning operations, or they can migrate from one region to another in shaped objects made of the polymer.

This invention has as an object the stabilization of polymeric materials subject to deterioration on exposure to ultraviolet light. A further object is the provision of compositions of such polymeric materials stabilized against such deterioration. Another object is such stabilized compositions of increased stability permanence. Still another object is such stabilized compositions free from migration of stabilizer. A still further object is the prevention or substantial retardation of the deterioration of polymeric materials by ultraviolet light through the use of polymeric stabilizers which, because of their non-migrating and non-volatile character, remain permanently associated with the polymer to be protected. Other objects will appear hereinafter.

These objects are accomplished by the compositions of this invention which comprise (1) an organic polymer containing carbon and hydrogen, any other constituent atoms present in the polymer molecule being chlorine, oxygen or sulfur; and (2) another polymer having a molecular weight of at least 10,000 and containing in the combined form at least 3% by weight of (a) salicylate units of the formula

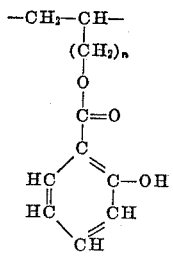

where $n$ is a cardinal number from 0 to 1, i.e., vinyl salicylate or allyl salicylate units, or (b) the same salicylate units in the form of their polyvalent metal chelates, said second polymer being present in amount such that there is present in the total composition from 0.5 to 25% of its weight of salicylate units.

The most important classes of polymers which can be stabilized against ultraviolet light degradation through the present invention are polymers of vinylidene monomers, polyesters and cellulosic polymers and include the chlorinated vinyl or vinylidene polymers, e.g., the polyvinyl halides, polyvinylidene chloride, polychloro-2-butadiene-1,3, polydichloro-2,3-butadiene-1,2, chlorinated polyethylene, chlorinated rubber, etc.; the sulfochlorinated hydrocarbon polymers; the polymerized vinyl esters of aliphatic carboxylic acids, e.g., polyvinyl formate, polyvinyl acetate, polyvinyl butyrate, etc.; the polymeric condensation products of polycarboxylic acids with polyhydric alcohols, e.g., polyethylene terephthalate, polyhexamethylene adipate, polyglyceryl phthalate, etc.; regenerated cellulose; cellulose esters, e.g., cellulose acetate, cellulose butyrate; cellulose ethers, e.g., methyl cellulose; polymerized vinyl hydrocarbons, e.g., polyethylene, poly-1,3-butadiene, polyisobutylene, polystyrene; polymerized acrylic or methacrylic acids or esters; and the like.

The salicylate group-containing polymers which serve as stabilizers for the polymeric compositions of this invention can be the homopolymers of vinyl salicylate or allyl salicylate. Preferably, however, they are copolymers of these monomers with another vinyl monomer. For this purpose, any vinyl monomer copolymerizable with vinyl or allyl salicylate is suitable. However, it is preferred, for reasons of compatibility and good film-forming properties, to use copolymers of vinyl or allyl salicylate with a monoethylenically unsaturated monomer of one of the following classes: acrylic esters of alkanols of 1 to 4 carbon atoms, e.g., methyl acrylate, ethyl acrylate, butyl acrylate; vinyl esters of aliphatic monocarboxylic acids of 1 to 4 carbon atoms, e. g., vinyl acetate, vinyl butyrate; and vinylidene hydrocarbons of 2 to 4 carbon atoms, e.g., ethylene, isobutylene. The vinyl or allyl salicylate copolymer should contain at least 3%, desirably at least 5% by weight of salicylate groups in order to impart appreciable stability to the light-sensitive polymer without using an excessive amount of the stabilizing polymer. Appreciable prevention of ultraviolet light damage is in general realized when the total composition, that is, the blend of polymer to be stabilized and stabilizing polymer, contains 0.5% of its total weight of salicylate groups. Preferably the final composition contains between 1% and 10% of its total weight of salicylate groups. It is unnecessary, and undesirable for economic reasons, that there be more than about 25% of salicylate groups in the final composition. It is also desirable that the final composition contain no more than 50%, preferably no more than 25%, by weight, of the stabilizing polymer, in order that the physical properties of the polymer to be protected be not modified to too large a degree.

The stabilizing polymer, whether it be a homopolymer or a copolymer of vinyl or allyl salicylate, should have a molecular weight of at least 10,000 and preferably above about 25,000 in order to possess satisfactory resistance to evaporating, migrating or leaching in the shaped polymeric articles in which it is present, and film-forming properties when it is used as a coating on a light-sensitive polymer. These properties are especially important in polymeric compositions for use in applications such as wrapping films, electrical insulation or fabrics. In such applications it is necessary that the light protecting agent be a permanent one. There is no theoretical upper limit to the molecular weight of the polymeric light stabilizers.

The polymers and copolymers of vinyl or allyl salicylate can be prepared by known methods of polymerizing vinyl monomers, such as emulsion or solution polymerization, using known polymerization initiators of the free radical-producing type such as ammonium persulfate, hydrogen peroxide, organic peroxides, azonitriles, and the like. Under controlled conditions, it is possible to obtain in a reproducible manner copolymers of varying composition, depending upon the relative proportions of comonomers in the reaction medium. The polymers and copolymers are normally obtained as essentially colorless materials ranging in physical appearance from tough transparent resins to stiff, opaque solids. A specific and particularly important class of vinyl and allyl salicylate copolymers, those in which the comonomer is ethylene, and the polyvalent metal chelates of these copolymers, are described and claimed in the copending application of Handy and Rothrock, Serial No. 511,780, filed May 27, 1955.

The salicylate polymers which serve as stabilizers in the composition of this invention can have their salicylate groups partly or wholly present in the form of chelates with polyvalent metals. These polymers, which contain a multiplicity of chelate-forming structures of the type

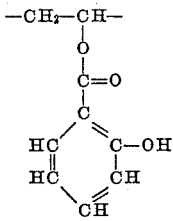

in the case of vinyl salicylate, or

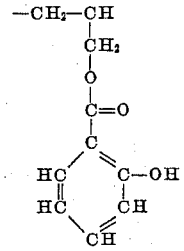

in the case of allyl salicylate, are capable of forming with polyvalent metals chelated products which are crosslinked through the six-membered chelate rings. To illustrate, with a divalent metal Me and polymers containing vinyl salicylate units, the resulting chelated polymer will be crosslinked through units of the type

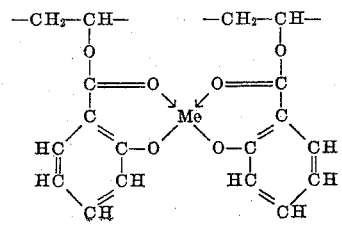

where the ring arrows represent coordinate linkages. More complex spatial structures are formed when the chelating metal has a valence higher than two.

The chelate crosslinked salicylate polymers, when such are desired for the purposes of this invention, may be conveniently prepared by the process of application Ser. No. 535,520, filed by Hoover and Miller on September 20, 1955. This new process, which has been called transchelation, consists broadly in treating an organic compound (e.g., a polymer) containing a plurality of chelate-forming structures with a chelate of a polyvalent metal with a volatile chelating agent, i.e., a chelating agent boiling below 300° C. at 760 mm. pressure, and evaporating the volatile chelating agent, thereby leaving a polymer crosslinked through metal chelate groups. What takes place in this process is a ligand exchange (organic compounds containing chelating structures being termed ligands), that is, a transfer of the metal from the chelating structure of the volatile chelating agent to those of the non-volatile polyligand. When the number $m$ of chelate-forming structures in the non-volatile polyligand and the principal valence $n$ of the metal are each at least two and the sum of $m$ and $n$ is at least five, a chelated polymer is formed and crosslinking through chelate rings takes place between the polymer molecules.

The outstanding advantage of the transchelation process just described is that the non-volatile polyligand and the polyvalent metal chelate of a volatile chelating agent can be combined in intimate admixtures, such as homogeneous solutions, without precipitation of the crosslinked, chelated polymer. Thus, these intimate mixtures can be formed, stored and handled at will, and it is only on removal of the volatile materials by evaporation that formation of the crosslinked polymer takes place. This is because of equilibrium between volatile and non-volatile ligands exists in the solutions, which is shifted, with formation of the chelate crosslinked polymer, when the volatile ligand is removed.

The intimate mixture of the polymer polyligand, i.e., the polymer containing salicylate groups, and the metal chelate of a volatile chelating agent need not be a homogeneous solution at room temperature. It is only necessary that its components form a homogeneous system at the temperature at which the ultimate shaped object (film, sheet, filament, etc.) is being formed. Additional inert solvents are not essential but are often used to aid in forming a solution. It is often desirable to add to the mixture a small additional amount of a volatile chelating agent, e.g., acetylacetone, as insurance against premature gelation.

The relative proportions of polymeric polyligand and polyvalent metal chelate of a volatile chelating agent can be such that there is present the calculated quantity of metal sufficient to chelate all the salicylate groups in the polyligand. However, in general, chelated polymers containing less than that amount of metal are preferred because of their greater flexibility and homogeneity. The desired quantity of metal can be introduced either by reacting a polyligand containing relatively few salicylate groups with the calculated amount of metal chelate, or by reacting a polyligand richer in salicylate groups with less than the calculated amount of metal chelate.

The compositions of this invention can be intimate blends of the ultraviolet light-sensitive polymers with the salicylate polymer; or they can be such that the salicylate polymer is spread as a uniform layer or coating over the surface of the ultraviolet light-sensitive polymer, the latter being present as a shaped object, e.g., film, sheet, filament, or molded article; or both types of compositions can be present in the same object. Blends of the two polymers can be prepared by any suitable method, e.g., intimate mixing of the solid polymers, milling on cold or hot rolls or solution or dispersion mixing.

A recently discovered method of bonding the two polymers consists in exposing to high energy radiation, such as that supplied by a Van de Graaff accelerator, a shaped object of the light-sensitive polymer immersed in or impregnated with monomeric vinyl or allyl salicylate, or a mixture thereof with another polymerizable monomer. By this procedure, which is illustrated in one of the following examples, the monomer polymerizes and there is formed a tenacious and permanent bond between the two polymers.

Chelation of the salicylate polymer, if it is desired, can be carried out during the blending operation or after coating. For example, a solution containing the salicylate polymer and the desired amount of chelate of the polyvalent metal with a volatile ligand [e.g., tris(ethylacetoacetato)-aluminum or bis(acetylacetono)nickel] can be intimately mixed with the light-sensitive polymer, as such or in solution. Upon evaporation of the solvents and heating, the above-described transchelation process takes place, leaving an intimate blend of the light-sensitive polymer with the partly or wholly chelated salicylate polymer. Coatings of the salicylate polymer, as such or in the chelated form, can be deposited on shaped objects of light-sensitive polymer by conventional means, such as solvent casting or hot pressing.

The following examples are illustrative of the invention.

*Example I*

A methyl acrylate/vinyl salicylate copolymer was prepared as follows: A solution of 10 g. of vinyl salicylate, 30 g. of methyl acrylate and 0.1 g. of benzoyl peroxide in 100 ml. of thiophene-free benzene was heated to reflux for 30 minutes. The resulting clear, viscous solution was stirred for 30 minutes with 10 ml. of absolute ethanol to destroy the excess peroxide. Removal of the solvents and unchanged monomers left 29.2 g. of a copolymer containing, as shown by carbon and hydrogen analysis, 22% by weight of polymerized vinyl salicylate and 78% by weight of polymerized methyl acrylate.

This polymer, with part of its salicylate groups chelated, was used to stabilize a polymer against discoloration by ultraviolet light as follows: A mixture of 21 g. of a copolymer of vinyl chloride (87% by weight) and vinyl acetate (13% by weight) having an inherent viscosity of 0.53 (available commercially under the name Vinylite VYHH) and 7 g. of the above 78/22 methyl acrylate/vinyl salicylate copolymer was blended by milling on rolls heated to 110–115° C. To the mixture being milled was added 0.58 g. of tris(acetylacetono)aluminum with a little additional acetylacetone as stabilizer. This amount of monomeric metal chelate is sufficient to chelate about 50% of the salicylate groups in the polymer mixture. Milling was continued until a homogeneous blend was obtained, after which the rolls were heated to 130° C. to complete the transchelation reaction and permit the acetylacetone to escape. The resulting sheet was press polished at 150° C. to give a transparent thin sheet of 7.7 mil thickness. This sheet was subjected to an accelerated exposure to ultraviolet light for 880 hours, together with a similar sheet of unmodified 87/13 vinyl chloride/vinyl acetate copolymer as a control. The apparatus (Weather-O-Meter) that used in ASTM Test D–822–46–T and described in Part 6 of ASTM Standards, 1952 edition. At the end of this test, there was a striking difference in color between the two samples. The control sheet was severely discolored, whereas the sheet of stabilized polymer was only light yellow in color.

*Example II*

The polymeric ultraviolet light stabilizer used in this example was a methyl acrylate/vinyl salicylate copolymer similar to that used in Example I but containing 18% by weight of polymerized vinyl salicylate. The polymer to be stabilized was a chlorinated ethylene polymer also containing sulfonyl chloride groups (see U.S. Patent 2,586,363). It contained about 29% chlorine and about 1.3% sulfur.

Two similar films, 3 mils thick, were cast from benzene solutions. The first one (sample A) consisted of the unmodified sulfochlorinated polyethylene. The second one (sample B) was sulfochlorinated polyethylene containing 10% of its weight of the methyl acrylate/vinyl salicylate copolymer and containing in addition, bis(acetylacetono)nickel II in an amount sufficient to chelate all the salicylate groups present. The two film samples were heated to 100° C. under reduced pressure to remove the solvent and (in the case of sample B) to complete the transchelation reaction by removing the acetylacetone. The films were then talced lightly to reduce surface tack. Their initial color and film properties were noted, and the samples were then exposed to ultraviolet light as in Example I for 500 hours.

At the end of this test, sample A (the control) had become dark and had undergone very considerable embrittlement. In contrast, sample B was not materially changed in color and, furthermore, showed no embrittlement whatever. The striking difference between sample A and sample B is shown by the following table of properties:

|  | Sample A | | Sample B | |
| --- | --- | --- | --- | --- |
|  | Initial | Exposed | Initial | Exposed |
| Color | None | Dark | None | None |
| Break elongation, percent | 320 | 29 | 370 | 460 |
| Modulus, lb./sq. in | 220 | 5,000 | 295 | 265 |

*Example III*

This example illustrates the coating with polymeric stabilizers of a polymer sensitive to ultraviolet light, in this case polyethylene terephthalate. Protective coatings about 0.1–0.2 mil thick of the vinyl salicylate polymers described below as A, B, and C were applied by solvent casting to polyethylene terephthalate films 1 mil in thickness.

(A) Homopolymer of vinyl salicylate. This was prepared by heating at 90° C. for 48 hours in a pressure vessel a solution of 25 g. of vinyl salicylate and 0.2 ml. of 2,2-bis(tert.-butylperoxy)butane in 40 ml. of chlorobenzene. The solvent and unreacted monomer were removed by steaming, leaving 23 g. of a brittle, transparent polymer of vinyl salicylate having an inherent viscosity of 0.35, measured in 0.5% concentration in m-cresol.

(B) A nickel chelate of an ethylene/vinyl acetate/vinyl salicylate 72/21/7 terpolymer, prepared as follows: A pressure vessel was charged with 15 g. of vinyl salicylate, 35 g. of vinyl acetate, 0.2 ml. of tert.-butyl peroxide, 25 ml. of chlorobenzene and 75 ml. of benzene. The vessel was sealed, heated to 135° C., pressured with ethylene to 650 atm. and these conditions were maintained for 4.9 hours. The resulting soft sponge of copolymer was steamed to remove solvent and unreacted monomers. There was left 57 g. of a transparent copolymer of inherent viscosity 0.94 in 0.1% solution in tetrahydronaphthalene at 125° C. It had a saponification equivalent, measured in pyridine, of 355, and infrared analysis indicated the presence of 7% of vinyl salicylate. From these data it was calculated that the polymer contained, by weight, 72% ethylene, 21% vinyl acetate and 7% vinyl salicylate. A solution of 5 g. of this polymer in 35 ml. of chloroform was treated with a solution of 0.2 g. of tris(butyl acetoacetato)nickel in 2.5 ml. of chloroform. This amount of nickel chelate is that calculated to chelate 50% of the salicylate groups in the polymer. A few drops of acetylacetone were added to the solution to prevent premature gelation.

(C) An 85/15 vinyl acetate/vinyl salicylate copolymer, prepared by refluxing for 12 hours in a nitrogen atmosphere a solution of 15 g. of vinyl salicylate, 85 g. of vinyl acetate and 1 g. of azobis(isobutyronitrile) in 200 ml. of tert.-butyl alcohol. The solvent and unreacted monomers were removed with steam, leaving 98 g. of the copolymer as a white resin, inherent viscosity 0.72 in benzene. Analysis (C, 57.38%; H, 6.75%) indicated that the copolymer contained 15% by weight of vinyl salicylate.

Coatings were applied from the above solutions onto polyethylene terephthalate film 1 mil thick as follows:

(A-1) A 30% solution of the polyvinyl salicylate (A) in acetone was prepared and doctored onto the base polyester film. A one-mil coating of the polymer solution was applied, air-dried and then dried 110° C. in the oven. The final coating was less than 0.1 mil in thickness.

(B-1) The polymer-nickel chelate solution described above in (B) was doctored onto the base polyester film. The coated film was dried in an oven at 120° C. for 5 minutes, during which time solvents and volatiles evaporated and transchelation took place, leaving a film of chelate crosslinked polymer on the base polyester film.

(C-1) The copolymer described in (C) above was applied onto the base polyester film by the procedure described under A-1.

All these coatings showed good adherence to the polyethylene terephthalate base.

The coated polyethylene terephthalate films were subjected with an uncoated control to accelerated weathering tests at 55-60° C. The apparatus used was essentially that described in method 6021 of Federal Specification L-P-406 except that the light was provided by special fluorescent sunlamps giving major radiation in the range of 2800-3200 A. units; the lamps and the samples were mounted vertically; and constant high humidity (R.H. =34%) was used instead of a fog spray. The light from this type of test lamp degrades polyester film much more rapidly than either sunlight or the light from a carbon arc lamp.

After 95 hours of exposure, the degree of embrittlement of each film was determined by measuring the residual average elongation at break, which was initially about 62% for all films. Polymer degradation in each film was also estimated by determining the inherent viscosity of the polymer after 95 hours' exposure, the initial inherent viscosity being about 0.55 in each case. The results are shown in the table below.

| Coating | Coating Thickness, Mils | Percent Elongation | Inherent Viscosity |
| --- | --- | --- | --- |
| A-1 | <0.1 | 31 | 0.46 |
| B-1 | 0.1 | 40 | 0.42 |
| C-1 | <0.1 | 10 | 0.32 |
| Control | | 0 | 0.30 |

The above table shows that the coatings had provided stabilization in varying degree, in spite of their thinness.

*Example IV*

A mixture of 19 parts of polyethylene and 1 part of an ethylene/vinyl salicylate copolymer containing 21% by weight of polymerized vinyl salicylate was blended on heated rolls to give a homogeneous composition from which films were pressed. Films of this blend and of a polyethylene control were exposed for 100 hours to ultraviolet light in the test apparatus used in Example I. At the end of this test, the rates of degradation of the films were determined on the basis of their tear strength. The comparison is indicated in the following tabulation.

| | Salicylate Blend, g. | Control, g. |
| --- | --- | --- |
| Original tear strength | 133 | 102 |
| Tear strength after 100 hours' exposure | 93 | too brittle to measure. |

*Example V*

A pine slab coated with an aluminum chelate of an ethylene/vinyl acetate/vinyl salicylate terpolymer (74/21/5 showed no discoloration after eight months' exposure to sunlight and weather in Florida, whereas an uncoated control was severely grayed and eroded.

*Example VI*

A copolymer of methyl acrylate and allyl salicylate was prepared by heating the monomers in 60:40 weight ratio, in benzene solution at 70-75° C. for 2 hours in the presence of azobis(isobutyronitrile) as the initiator. The copolymer was isolated by pouring the solution into methanol. It contained, by weight 87% of methyl acrylate and 13% of allyl salicylate.

A uniform coating of this copolymer was deposited from solution onto a polyethylene terephthalate film 1 mil thick. The coated sample and an uncoated control were then subjected to an accelerated weathering test as described in Example III. After 90 hours' exposure, the control was very severely embrittled, as shown by a decrease in elongation at break from 75% to 3%, and it had lost one-third of its initial tenacity. In contrast, the coated film (tested after stripping off the coating) still showed 68% elongation at break and a loss in tenacity of only 13%.

*Example VII*

A coating solution was prepared by dissolving in xylene an 88/12 (by weight) copolymer of ethylene and vinyl salicylate, sufficient tris(acetylacetono)aluminum to chelate 75% of the chelating structures present in the copolymer, and a little acetylacetone to stabilize against gelation. This solution was applied to a commercial regenerated cellulose film 1.3 mils thick in amount sufficient to deposit on the film 7.45 g. per square meter of the chelate cross-linked polymer after evaporation of the solvents and heating.

This coated film and an uncoated control were subjected to accelerated exposure tests in the apparatus of Example II. After 1020 hours' exposure, the coated sample had retained its original dimensions, tensile strength and modulus and had suffered only a moderate loss in elongation. In comparison, the uncoated control after only 200 hours had undergone severe shrinkage and substantial losses in tensile strength, modulus and elongation. After 1020 hours, the control had disintegrated completely.

*Example VIII*

A sample of polyethylene terephthalate film approximately 0.8 mil in thickness was placed in a glass cell with thin sides. The cell was filled with monomeric vinyl salicylate, sealed and wrapped in aluminum foil. It was then given 10 passes in a Van de Graaff accelerator, one pass consisting of exposing the sample, traveling at a speed of 2 cm./sec., to an electron beam having an electron energy of 2 m.e.v., using a scan width of 20 cm., a sample-to-window distance of 10 cm., and a beam current of 250 microamperes. After irradiation, the cell was opened and the film was continuously extracted with methyl ethyl ketone for 16 hours and dried at 60° C. It had gained 3.6% in weight and its thickness had increased to approximately 0.95 mil. The presence of polyvinyl salicylate was confirmed by the fact that the film absorbed radiation in the region of 3100-3400 A. whereas a control film showed little absorption in this region.

The composite prepared as described above had an inherent viscosity of 0.55. After 75 hours' exposure in the accelerated weathering apparatus of Example III, the inherent viscosity of the composite was still 0.50, showing that little degradation had taken place. As a control, a sample of polyethylene terephthalate film was irradiated in the same manner (10 passes) without the vinyl salicylate. Its inherent viscosity was 0.54. After 75 hours' exposure in the same weathering apparatus, its intrinsic viscosity had decreased to 0.40.

This invention has been illustrated with reference to certain specific polymeric compositions, but it includes broadly compositions comprising any polymer susceptible to degradation by light of wavelength in the range of about 2300–3600 A. units and, in amount sufficient for appreciable stabilization, a polymer containing vinyl salicylate or allyl salicylate units, as such or as metal chelates. Thus, in addition to the compositions shown in the foregoing examples, there can be prepared compositions of ethylene/vinyl acetate copolymers with ethylene/vinyl salicylate copolymers; of polyvinyl chloride with allyl salicylate homopolymer, vinyl acetate/allyl salicylate copolymer or vinyl formate/vinyl salicylate copolymer; of polyvinylidene chloride with ethylene/allyl salicylate copolymer or vinyl butyrate/vinyl salicylate copolymer; of poly-chloro-2-butadiene-1,3 with methyl acrylate/allyl salicylate copolymer, isobutylene/vinyl salicylate copolymer of butyl acrylate/vinyl salicylate copolymer; of chlorinated polyethylene with vinyl salicylate homopolymers; of polyvinyl formate with vinyl acetate/allyl salicylate copolymer; of polyhexamethylene adipate with methyl acrylate/vinyl salicylate copolymer; of polyglyceryl phthalate with polyvinyl salicylate; of cellulose acetate with butyl acrylate/vinyl salicylate copolymer; of cellulose or methyl cellulose with methyl acrylate/vinyl salicylate copolymer; and the like. In preparing polymer blends it is desirable, although not essential, that the salicylate group-containing polymer be compatible with the light-sensitive polymer. This is of no importance when the light-sensitive polymer is coated with the polymeric stabilizer.

In the compositions of this invention, part or all of the vinyl salicylate or allyl salicylate units may be present as chelates of polyvalent metals. The polyvalent metals known to form chelates readily are listed in the book by Martell and Calvin entitled "Chemistry of the Metal Chelate Compounds" (Prentice-Hall, Inc., New York, 1952), particularly at page 182. Preferred examples of metals suitable for chelation with the salicylate polymers are aluminum and zirconium, because their chelates are colorless and have particularly good resistance to hydrolysis. Other suitable metals are zinc, magnesium, and beryllium, whose chelates are also colorless; and copper, manganese, iron, cobalt and nickel when colored products are desired or not objectionable. Nickel and copper chelates are particularly effective as ultraviolet light screens.

For the purpose of preparing the chelate cross-linked polymers by transchelation, that is, reaction of the polymeric polyligand with a polyvalent metal chelate of a volatile chelating agent, any suitable chelating agent boiling below about 300° C. at 760 mm. will serve. The preferred ones are those most available and most economical, which are in general the 1,3-diketones, the β-ketoesters and the aromatic α-hydroxy aldehydes and esters. Specifically preferred chelating agents are acetylacetone, 3-methyl-2,4-pentanedione, 3-ethyl-2,4-pentanedione, propionylacetone, trifluoroacetylacetone, 2-furoylacetone, 2-thenoylacetone, ethyl acetoacetate, butyl acetoacetate, salicylaldehyde, methyl salicylate, and the like. Thus, there may be employed for reaction with the polymers or copolymers of vinyl salicylate or allyl salicylate the following representative polyvalent metal chelates of volatile chelating agents in addition to those illustrated in the examples: bis(ethyl acetoacetato)zinc; bis(ethyl acetoacetato)cobalt II; bis(butyl acetoacetato) copper II; bis(salicylaldehydo)copper II; bis(acetylacetono)magnesium; tetrakis(ethyl acetoacetato)zirconium; tris(methyl salicylato)aluminum; bis(methyl salicylato) beryllium; bis(ethyl acetoacetato)magnesium; diisopropyl bis(ethyl acetoacetato)titanate IV; bis(acetylacetono) manganese II; tris(ethyl acetoacetato)iron III; tris(acetylacetono)iron III; bis(1,1,1-trifluoro-3-benzoylacetono) copper II; tris[2-(furoyl)acetono]aluminum; and the like.

When a chelated polymer is desired as the light stabilizer, the polymeric polyligand is desirably treated with sufficient metal chelate to produce a final polymer containing at least 0.001 gram atom, and preferably from 0.005 to 0.03 gram atom of metal per 100 g. of chelated polymer. In this treatment and in the subsequent evaporation of the volatile chelating agent, no additional solvent is required in many cases, although an additional solvent is often desirable to provide a solution of convenient viscosity for the purpose of producing shaped articles. The solvent can be any volatile liquid which is substantially inert towards the two components of the mixture of solution. Suitable organic solvents include aromatic hydrocarbons, e.g., benzene, toluene or the xylenes; acyclic or cyclic ethers, e.g., di-n-butyl ether, tetrahydrofuran; ketones, e.g., methyl isobutyl ketone, cyclohexanone; halohydrocarbons, e.g., chloroform; and the like. The quantity of solvent is not critical and needs only be sufficient to decrease the viscosity of the composition to a level practical for film casting or similar uses. If some tendency to precipitation or gelation is noted on mixing the reactants, such tendency can be overcome by adding a slight excess of the volatile chelating agent, or of a different one having greater chelating strength than the polymeric ligand to keep the chelated polymer in solution.

The chelated polymers cast or otherwise formed from these compositions become tack-free rapidly upon air-drying, and even more rapidly upon baking, for example, at temperatures of 50 to 200° C. for from 15 minutes to two hours. The resulting products are polymers of vinyl or allyl salicylate crosslinked through the six-membered chelate rings formed by the polyvalent metal and the salicylate groups.

The polymeric products of this invention are useful in all applications where the unstabilized light-sensitive polymers are useful. They are, of course, of special utility wherever shaped objects made of these polymers (e.g., filaments, films, sheets, coatings, moldings) are exposed to light rich in radiations in the ultraviolet range. Specifically, the polymeric compositions of this invention are useful as protective coatings for surfaces such as wood, fabrics and especially metals, e.g., refrigerators, autobodies, furniture, and the like; as flexible sheets for use in articles such as bags, hat covers, overshoes, capes, and the like; as filaments for fabrics for outer wear; as wrapping materials for food products; as book covers, flexible wire coating, electrical insulation, electrical tape; as glass laminates, sunshades, umbrellas, visors; in the manufacture by molding or extruding of shaped objects such as tumblers, chips, tubes, novelty articles; and the like.

In comparison with prior blends of light-sensitive polymers with monomeric salicylic acid esters, the polymeric composites of this invention have the advantage that the stabilizer is substantially permanent and non-removable by physical procedures such as solvent extraction.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A composite resistant to light radiations in the wave length range of about 2300 to 3600 A., containing an organic polymer subject to deterioration on exposure to light and containing carbon and hydrogen with any additional elements selected from the class consisting of chlorine, oxygen and sulfur, said polymer being selected from the group consisting of polymers of vinylidene monomers, polyesters and cellulosic polymers and as a stabilizer therefor not more than 50% by weight of a second polymer of molecular weight of at least 10,000 selected from the group consisting of homopolymers of vinyl and allyl salicylate and copolymers of these monomers with monoethylenically unsaturated monomers, said second polymer being present in amounts such that from 0.5 to 25% by weight of the composite is salicylate units.

2. The composite of claim 1 wherein the second polymer contains in addition to the salicylate monomer, units of a vinyl monomer different from that furnishing the salicylate units.

3. The composite of claim 1 wherein the second polymer contains units of an acrylic ester of an alkanol of 1–4 carbons, in addition to the salicylate units.

4. The composite of claim 1 wherein the second polymer contains units of a vinyl carboxylate, in addition to the salicylate units.

5. The composite of claim 1 wherein the second polymer contains units of a vinylidene hydrocarbon of up to 4 carbons, in addition to the salicylate units.

6. The composite of claim 1 wherein the salicylate units are present in the form of a homopolymer of the salicylate monomer.

7. The composite of claim 1 wherein the polymer containing salicylate units is in lamellar relationship to the organic polymer subject to deterioration on exposure to light.

8. The composite of claim 1 wherein the polymer containing salicylate units is in intimate admixture with the organic polymer subject to deterioration on exposure to light.

9. The composite of claim 1 wherein the salicylate units are present in the form of chelates thereof with a polyvalent chelating metal.

10. A composite according to claim 5 wherein the light-sensitive polymer is polyethylene and the second polymer an ethylene/vinyl salicylate copolymer.

11. A composite according to claim 5 wherein the light-sensitive polymer is polyethylene terephthalate and the second polymer is an ethylene/vinyl salicylate copolymer.

12. The composite of claim 9 wherein the second polymer contains in addition to the salicylate monomer, units of a vinyl monomer different from that furnishing the salicylate units.

13. The composite of claim 9 wherein the second polymer contains units of a vinylidene hydrocarbon of up to 4 carbons, in addition to the salicylate units.

14. The composite of claim 9 wherein the salicylate units present in the form of a homopolymer of the salicylate monomer.

15. The composite of claim 9 wherein the polymer containing salicylate units is in lamellar relationship to the organic polymer subject to deterioration on exposure to light.

16. The composite of claim 9 wherein the polymer containing salicylate units is in intimate admixture with the organic polymer subject to deterioration on exposure to light.

17. A film formed of the composition of claim 1.

18. A filament formed of the composition of claim 1.

19. A coated object comprising a substrate having a coating of the composition of claim 1.

20. A composite resistant to light radiations in the wave length range of about 2300 to 3600 A. containing an organic polymer subject to deterioration on exposure to light and containing carbon and hydrogen with any additional elements selected from the class consisting of chlorine, oxygen and sulfur, said polymer being selected from the group consisting of polymers of vinylidene monomers, polyesters and cellulosic polymers and as a stabilizer therefor not more than 50% by weight of a second polymer of molecular weight of at least 10,000 selected from the group consisting of homopolymers of vinyl and allyl salicylates and copolymers of these monomers with monoethylenically unsaturated monomers, and polyvalent metal chelates of such polymers wherein the polymer is cross-linked through six-membered chelate rings formed by the polyvalent metals and the salicylate ester groups, said second polymer being present in amount such that from 0.5 to 25% by weight of the composite is salicylate units.

No references cited.